US 6,686,930 B2

(12) United States Patent
Powers et al.

(10) Patent No.: US 6,686,930 B2
(45) Date of Patent: Feb. 3, 2004

(54) TECHNIQUE FOR ACCOMPLISHING COPY AND PASTE AND SCAN TO FIT USING A STANDARD TWAIN DATA SOURCE

(75) Inventors: John G. Powers, Ontario, NY (US); Boris M. Feygin, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 403 days.

(21) Appl. No.: 09/726,102

(22) Filed: Nov. 29, 2000

(65) Prior Publication Data

US 2002/0063724 A1 May 30, 2002

(51) Int. Cl.[7] .................................................. G09G 5/00
(52) U.S. Cl. ....................... 345/724; 345/619; 345/620; 345/624; 345/630; 345/723; 345/800
(58) Field of Search ................................. 345/418, 619, 345/620, 621, 624, 629, 630, 632, 635, 643, 650, 655, 674, 676, 700, 708, 714, 716, 717, 722, 723, 724, 800, 798, 799, 813–815, 850, 855, 862; 715/516, 517, 522, 523, 900, 911; 358/1.1, 1.2, 1.5, 2.1, 474, 442, 401; 709/201, 203, 217, 310, 321, 331, 328

(56) References Cited

U.S. PATENT DOCUMENTS 6,003,093 A * 12/1999 Kester ......................... 709/321
6,011,553 A * 1/2000 Komiyama .................. 345/839
6,167,456 A * 12/2000 Daur et al. .................. 709/321
6,256,662 B1 * 7/2001 Lo et al. ..................... 709/203
6,272,251 B1 * 8/2001 de Queiroz et al. ........ 382/232
6,301,586 B1 * 10/2001 Yang et al. .............. 707/104.1
6,425,001 B2 * 7/2002 Lo et al. ..................... 709/217
6,453,080 B1 * 9/2002 Kao ............................ 382/312
6,480,304 B1 * 11/2002 Os et al. ..................... 358/474
6,545,669 B1 * 4/2003 Kinawi et al. .............. 345/173
6,553,129 B1 * 4/2003 Rhoads ....................... 382/100

* cited by examiner

Primary Examiner—Matthew C. Bella
Assistant Examiner—Wesner SaJous
(74) Attorney, Agent, or Firm—Fay, Sharpe, Fagan, Minnich & McKee, LLP

(57) ABSTRACT

A method for copying and pasting a selected portion of an image from a TWAIN compliant image source includes scanning the selected image portion to fit in a target area of a destination image. Dimensional information regarding the selected portion of the source image is made available to the application. The application compares dimensions of the target area with the dimensional information of the selected source image portion and determines resizing parameters. The application requests a scan of the selected portion of the source image based on the resizing parameters and pastes the resulting image in the target area. An image processing system operative to carry out the method includes and a TWAIN compliant application that is adapted to calculate resizing parameters and request scans basted on the resizing parameters. In a xerographic environment, the image processing system includes a xerographic printer.

17 Claims, 5 Drawing Sheets

TECHNIQUE FOR ACCOMPLISHING COPY AND PASTE AND SCAN TO FIT USING A STANDARD TWAIN DATA SOURCE

BACKGROUND OF THE INVENTION

1. Field of the Invention

The invention relates to the art of document processing. More specifically, the invention relates to the art of copying a first image or portion of a first image and pasting the copy into a second image or portion of a second image where the source of the first image is a TWAIN data source. For example, the invention finds use where the first image data source is a TWAIN compliant scanner or image database. While the invention is described in relation to a TWAIN compliant scanner, the invention may be used in association with any TWAIN complaint data source.

2. Description of Related Art

TWAIN is the name of a protocol or communications standard that has been developed in order to help image processing devices communicate with each other. For example, TWAIN is used to help computers communicate with scanners and digital cameras. Additionally, TWAIN is used in some xerographic environments. Complete details of the TWAIN standard are available from The TWAIN Working Group, 13090 Hwy. 9, Suite 3, Boulder Creek, Calif. 95006.

Understanding of aspects of the invention may be aided by a review of some aspects of the TWAIN standard.

TWAIN defines a standard software protocol and application-programming interface (API) for communication between software applications and image acquisition devices (the source of the data). Three main elements in TWAIN are: 1) an application, such as, for example, a document scan and make ready tool, a desktop publishing application, a word processing application and document or image processors; 2) source software, which is software that controls an image acquisition device and is written by the image acquisition device developer to comply with TWAIN specifications; and 3) source manager software, which is software that manages interactions between the application and the Source.

FIG. 1 shows exemplary components of TWAIN compliant image processing systems 110. An application 114 sends commands to a source 118 by sending commands, in the form of TWAIN operation triplets, to the Source Manager 122. The Source Manager sends the triplets on to the source software ("Source") 126.

An operation is an action that the application 114 or Source Manager 122 invokes. A triplet is a command that uniquely, and without ambiguity, specifies a particular action. No operation is specified by more than a single triplet. Three parameters make up a triplet. The three parameters are Data Group, Data Argument Type, and Message ID. Each parameter conveys specific information.

Operations are divided into large categories by the Data Group identifier (Data Group (DG_xxxx)). There are only three data groups currently defined in TWAIN. A Control Data Group (DG_CONTROL) includes operations that involve control of a TWAIN session. An example where DG_CONTROL is used as the Data Group identifier is the operation to open the Source Manager. An IMAGE Data Group (DG_IMAGE) includes operations that work with image data. An example where DG_IMAGE is used as a Data Group is an operation that requests the transfer of image data. An AUDIO Data Group (DG_AUDIO) includes operations that work with audio data from, for example, some digital cameras. An example where DG_AUDIO is used as a Data Group is an operation that requests the transfer of audio data.

One of TWAIN's benefits is it allows applications to easily interact with a variety of acquisition devices. Devices can provide image or audio data. For instance, some devices have automatic document feeders. Furthermore, some devices are not limited to one image but can transfer multiple images. Some devices support color images. Some devices offer a variety of halftone patterns. Some devices support a range of resolutions while others may offer different choices. For example, many devices operating in a xerographic environment have automatic document feeders. Many xerographic devices can transfer multiple images between a scanner and an application. Some devices operating in xerographic environments operate in color and offer a variety of halftone patterns. Some devices allow the recording of audio data associated with an image.

It is important for an application to be aware of a Source's capabilities. For example, the capabilities of a source may influence the way an application chooses to scale or resize an image. Therefore TWAIN allows an application to perform capability negotiation with a source. The application generally follows this process: 1. Determine if the selected Source supports a particular capability. 2. Inquire about the Current Value for this capability. Also, inquire about the capability's Default Value and a set of available values that are supported by the Source for that capability. 3. Request that the Source set the Current Value to the application's desired value. The Current Value will be displayed as the current selection in the Source's user interface ("UI"). 4. Limit, if needed, the Source's available values to a subset of what would normally be offered. For instance, if the application wants only black and white data, it can restrict the Source to transmit only black and white data. 5. Verify that the new values have been accepted by the Source.

There are three modes that can be used to transfer data from the Source to the application. The three modes are native, disk file, and buffered memory.

Every Source must support Native transfer mode. It is the default mode and is the easiest for an application to implement. However, it is restrictive (i.e. limited to Device-Independent Bitmap (DIB) or PICT formats and limited by available memory). The format of the data is platform-specific. For example Windows applications use DIB. The Source allocates a single block of memory and writes the image data into the block. The Source passes a pointer to the application indicating the memory location of the block. The application is responsible for freeing the memory after the transfer.

A Source is not required to support Disk File transfer mode but it is recommended. In Disk File transfer mode, the application creates the file to be used in the transfer and ensures that it is accessible by the Source for reading and writing. A capability exists that allows the application to determine which file formats the Source supports. The application can then specify the file format and file name to be used in the transfer. The Disk File mode is ideal when transferring large images that might encounter memory limitations with Native mode. Disk File mode is simpler to implement than the Buffered Memory mode. However, Disk File mode is a bit slower than Buffered Memory mode and the application must be able to manage the file after creation.

Every Source must support Buffered Memory transfer mode. The transfer occurs through memory using one or more buffers. Memory for the buffers is allocated and deallocated by the application. The data is transferred as an unformatted bitmap. The application must use information available during the transfer to learn about each individual buffer and be able to correctly interpret the bitmap.

If using the Native or Disk File transfer modes, the transfer is completed in one action. With the Buffered Memory mode, the application may need to loop repeatedly to obtain more than one buffer of data. Buffered Memory transfer offers the greatest flexibility, both in data capture and control. However, it is the least simple to implement.

Referring to FIG. 2, it is logical that a process for communicating between image processing devices, such as the TWAIN protocol, must occur in a particular sequence. For example, the application cannot successfully request the transfer of data from a Source before the Source Manager is loaded and prepared to communicate the request. To ensure the sequence is executed correctly, the TWAIN protocol defines seven states 210 that exist in TWAIN sessions. A session is, for example, a period while an application is connected to a particular source via the Source Manager. The period while the application is connected to the Source Manager is another unique session. At a given point in a session, the TWAIN elements of Source Manager and Source each occupy a particular state. Transitions to a new state are caused by operations requested by the application or Source. Transitions can be in the forward or backward direction. Most transitions are single-state transitions. For example, an operation moves the Source Manager from State 1 to State 2 and generally not from State 1 to State 3. However, there are situations where a two-state transition may occur. The situations are discussed in Chapter 3 of the TWAIN specification.

When viewing the state-based protocol, it is helpful to remember that States 1, 2, and 3 are occupied only by the Source Manager. The Source Manager never occupies a state greater than State 3. States 4, 5, 6, and 7 are occupied exclusively by Sources. A Source never has a state less than 4 if it is open. If the Source is closed, the Source has no state. If an application uses multiple Sources, each connection is a separate session and each open Source "resides" in its own state without regard for what state other Sources are in.

From any given state, only certain operations are possible. Additionally, any given operation can only be performed from a certain state. For example, the only time an acquire or scan operation can be performed is during a transition from TWAIN state 4 220 to state 5 224. State 5 includes the displaying of a source user interface ("UI"). These facts set up a conundrum. In order to copy or cut, and past a portion of a scanned image into, for example a document or image in an application, an application must tell the scanner which part of the image to scan. However, a user cannot make a source image selection, thereby informing the application which part of the image is of interest, until the source is displaying the image. When the source is in state 5 224 and displaying the image, the application can no longer send a command to scan the selected portion of the image. Therefore, cutting or copying and pasting a portion of an image from a TWAIN data source has involved a process of trial and error. While the source is in state 5, with a UI showing, a user makes an image portion selection and requests a scan. The scan is made, image portion data is transferred to the application, and the Source returns to state 4 or is closed completely. The user then manipulates the image portion in the application in an attempt to make the image portion fit in a target location. If the attempt is unsuccessful, the user must reopen the Source UI and make a new selection. Additionally, the user may request that a new scan be made with a different scaling factor and/or with a different scanning resolution. These steps are repeated until the user is satisfied with an image portion selection and with an image portion scaling and alignment in the target area. This process can be frustrating and time consuming.

Therefore, a method for copying and pasting from a TWAIN data source that provides for automatic scanning to fit, thereby reducing or eliminating numerous scanning iterations in a document or image preparation process is desirable.

BRIEF SUMMARY OF THE INVENTION

To those ends, a method operative to accomplish copy and paste, and scan to fit, using a TWAIN data source has been developed. The method comprises the steps of selecting a target portion of a destination image that is displayed in an application, selecting a portion of a source image that is displayed in a source user interface, passing coordinate information, corresponding to the selected portion of the source image, to the application, determining at least one resizing parameter based on differences between the target portion of the destination and the selected portion of the source image, scanning the selected portion of the source image in a manner that is based on the resizing parameters to generate a properly scaled copy of the selected portion of the source image, and pasting the properly scaled copy in at the target portion of the destination image.

An exemplary embodiment of the method is operative to copy and paste a portion of a TWAIN compliant data source into an image displayed by a TWAIN compliant application. The method includes selecting a preview mode resolution setting, determining initial selection box settings, opening a TWAIN compliant data source, thereby placing the data source in TWAIN state 4, enabling the data Source with SHOWUI=TRUE, thereby displaying a Source user interface, and passing the selected preview mode resolution setting and the selection box settings to the data source, thereby causing an image to be pre-scanned and displayed along with a selection box as described by the initial selection box settings, and placing the data source in TWAIN state 5, adjusting the selection box settings if need be, in order to select a desired portion of the image for scanning and copying, scanning the selected portion of the image, thereby transitioning to TWAIN state 6, transferring the scanned portion to the application, thereby passing the adjusted selection box settings to the application, returning the source back through TWAIN states 6, 5, and 4, determining resizing parameters based on the adjusted selection box settings and dimensions of a target area in the image in the application, enabling the data source with SHOWUI=FALSE, thereby preventing the display of the Source user interface, and passing resizing parameters and the adjusted selection box settings to the data source, thereby causing the image to be scanned, creating an appropriately sized copy of the selected portion of the image, transferring the appropriately sized copy of the selected portion of the image to the application, and placing the copy of the selected portion of the image in the target area.

An image processing system operative to communicate with a TWAIN image source, and copy and paste, and scan to fit, a selected portion of a source image, into a selected target area, in a destination image includes a TWAIN image source, a source manager, and an application. The application is operative to communicate with the image source, through services of the source manager, to receive a properly sized copy of the selected portion of the source image, and to automatically paste the properly sized copy of the selected portion of the source image into the selected target area of the destination image. In this way the application is used to generate a revised version of the destination image. The image processing system also includes an output device operative to receive the revised image. An example of an output device used when such and application is run in a xerographic environment is a xerographic printer.

One advantage of the present invention is the elimination of frustrating trial and error procedures in copying and pasting operations involving TWAIN sources. For example, scaling and/or resolution parameters are calculated and set automatically. This eliminates guesswork on the part of a user.

Another advantage of the present invention resides in the ability to use the scanner to do resizing. Since the scanner does both resizing and image processing, resizing can be done prior to image processing, thereby preventing scaling artifacts that occur when scaling is done after some image processing methods are applied.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 3:
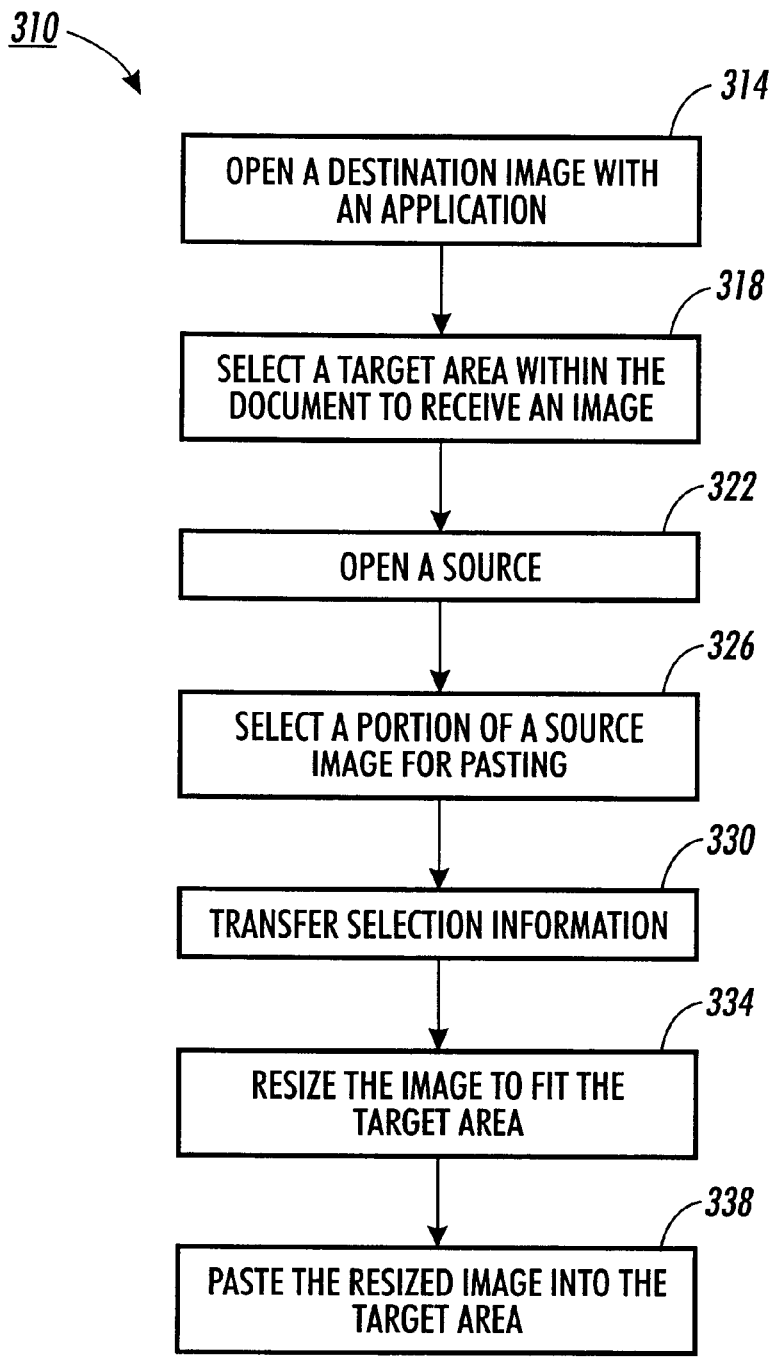
FIG. 3 is a flow diagram of a method for copying and pasting and scanning to fit in a TWAIN environment, as seen from a users perspective.

Referring to FIG. 3, a method 310 for copying and pasting and scanning to fit in a TWAIN environment, as seen from a users perspective, includes a destination image opening step 314. The destination image is open in an application. Typically the application is an image processing application such as a document processor, desktop publisher or document scan and make ready tool ("DSM"). For example, the destination is open in an application run in a xerographic environment, or on a personal computer. Typically, the environment the application is run on includes an interface, such as, for example a display screen, a keyboard and/or a pointing device such as a mouse. Preferably the application is useful for creating and editing images or documents. The application is TWAIN compliant. The application has the ability to communicate with TWAIN sources through a TWAIN Source Manager. In the destination image opening step 314 a destination image or document is opened or created. The destination image is displayed, for example in a window of the application as shown on the display screen.

In a target area selection step 318 the user selects a portion of the destination image as a target for the placement of a new image. For example, the user uses a rubber band box or selection tool to indicate to the application that a portion or target area of the destination image is to be replaced with a new image. Of course, the user may indicate that the whole image is to be replaced. For example, the rubber band box may be sized and positioned so as to encompass the entire destination image.

In a source-opening step 322 the user indicates that the new image is to come from a TWAIN image source. For example, the user chooses a source device or file from a menu. Additionally, the user enters an acquire or scan command. For example, the user selects—acquire—from a menu of the application. Preferably, where the source device is a TWAIN compliant scanner, the user has made a source image available to the scanner. For example, the user places an image on a scanning platen or input tray of the scanner. The acquire command causes a Source user interface ("UI") to appear. For example, a UI window is opened. The source image is scanned and a representation of the image is displayed in the UI window. In a source portion selection step 326, the user indicates to the application (through the source UI and Source Manager) which portion of the source image is to be copied and pasted in the selected target area. For example, a selection tool, such as, for example, a rubber band box is placed around a portion of the representation of the image. This indicates the portion of the source image that the user wishes to copy and paste into the destination image. When the user is satisfied with the indicated selection, the user indicates that the selection is a final selection. For example, the user selects a scan command from a menu in the UI. Typically, the indication that the selection is final causes the selected portion to be rescanned. For example, the indicated portion is rescanned at a higher resolution. In a selection information transfer step 330, information about the selected portion of the source image is transferred to the application. This is an internal step and not necessarily known to the user. Typically, the UI closes at this point. Additionally image information may also be transferred to the application. However, the method does not require image information to be transferred at this point. If image information is transferred, it is as a side effect of the TWAIN commands used to access the selection information. This is discussed in further detail in reference to FIG. 4.

In a resizing step 334 the application arranges for a resized version of the selected portion of the source image to be placed in the target area of the destination image. The details of the resizing are discussed in relation to FIG. 4. Of course, if the size and shape of the target area and the size and shape of the selected portion of the source image are the same, then the resizing step has no effect on the size and shape of the copied portion. However, an automatic scanning resolution selection aspect of resizing may still be applied.

In a pasting step 338, the resized version of the copied portion of the source image is pasted into the target area of the destination image.

Figure 4:
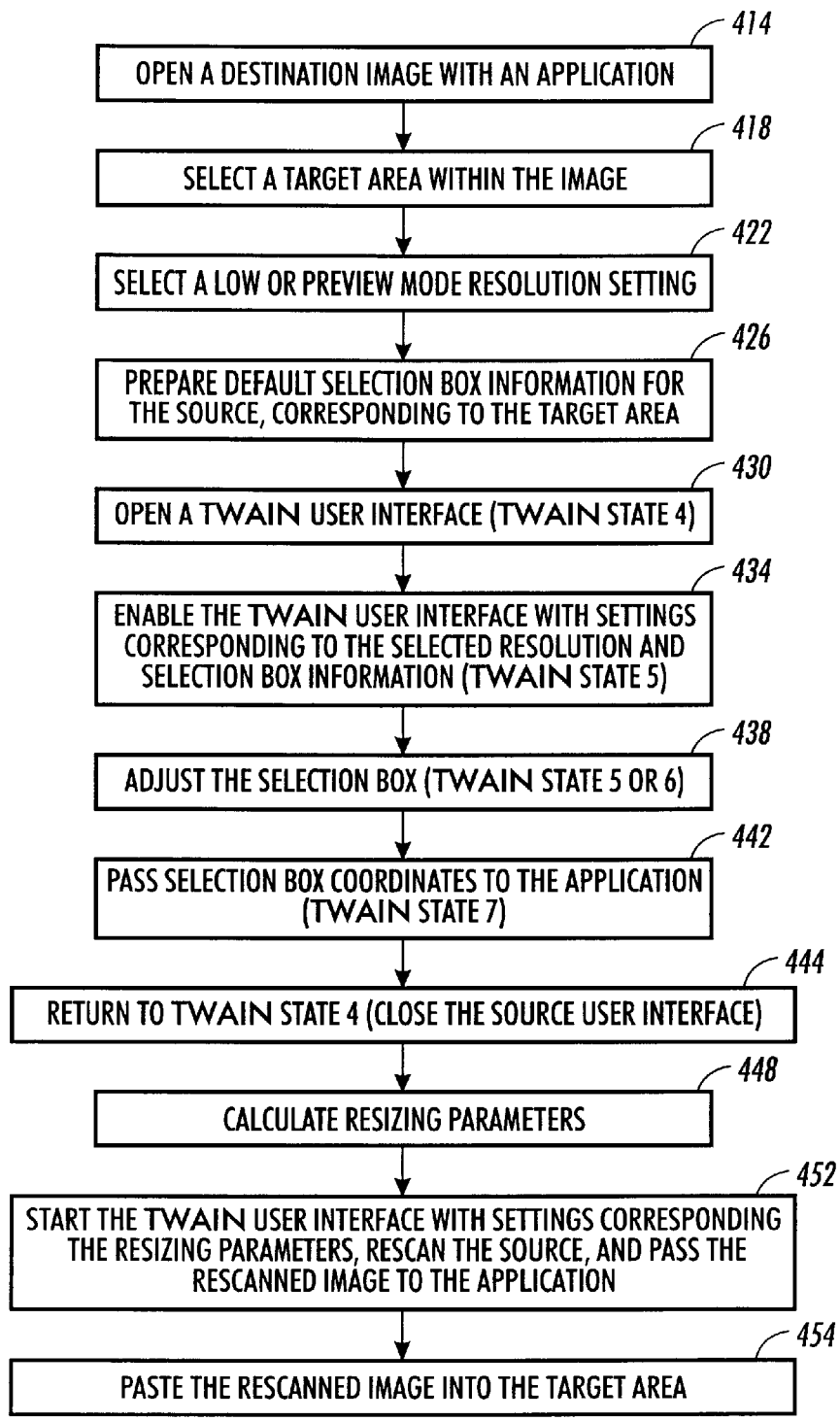
FIG. 4 is a more detailed flow diagram of the method of FIG. 3 including activities of various software modules.

The method 310 for copying and pasting and scanning to fit in a TWAIN environment is described in FIG. 4 from the point of view of the application, a Source Manager, Source software and a source device.

Figure 1:
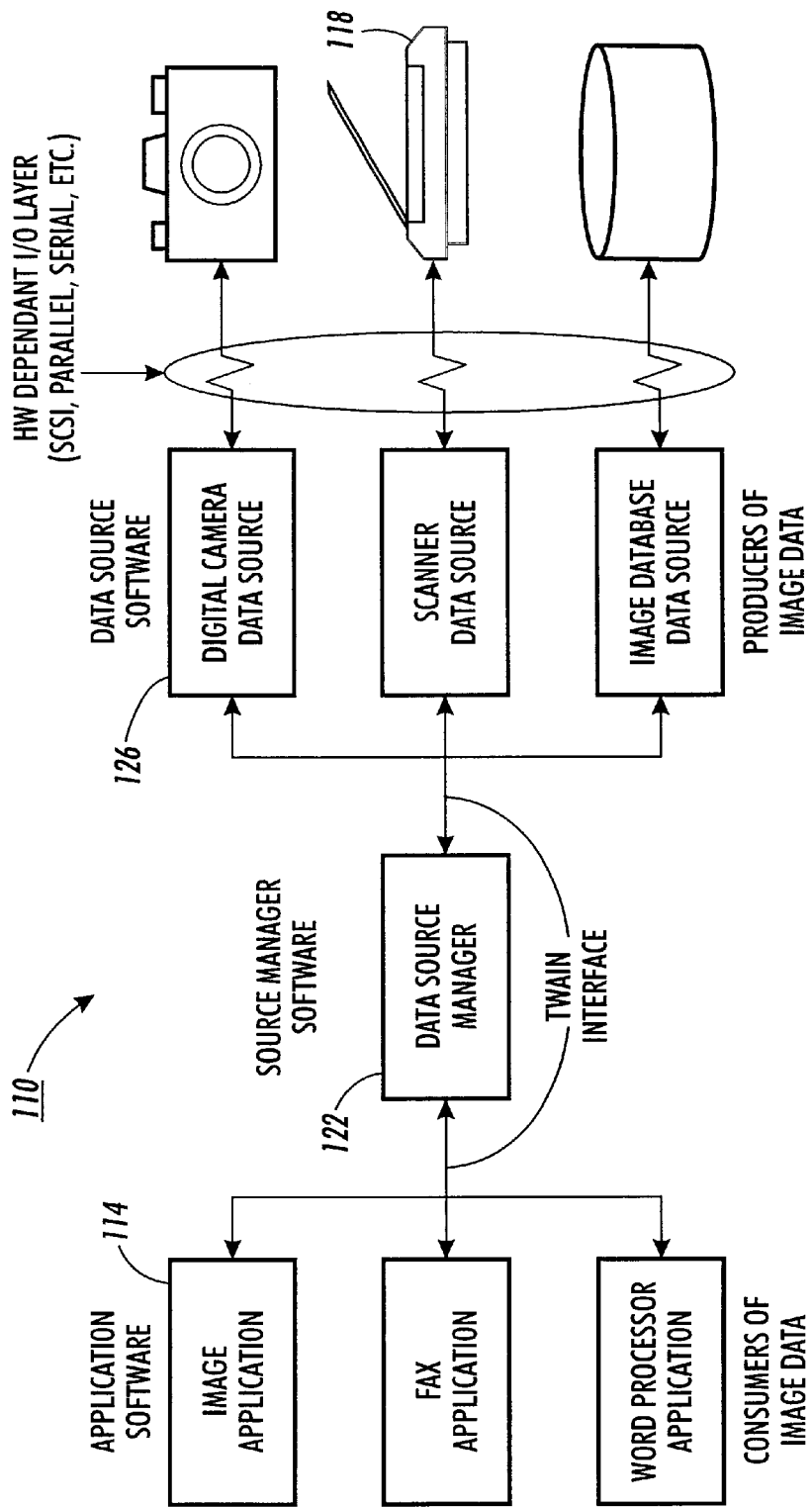
FIG. 1 is schematic diagram of a typical TWAIN based image processing system.
Figure 2:
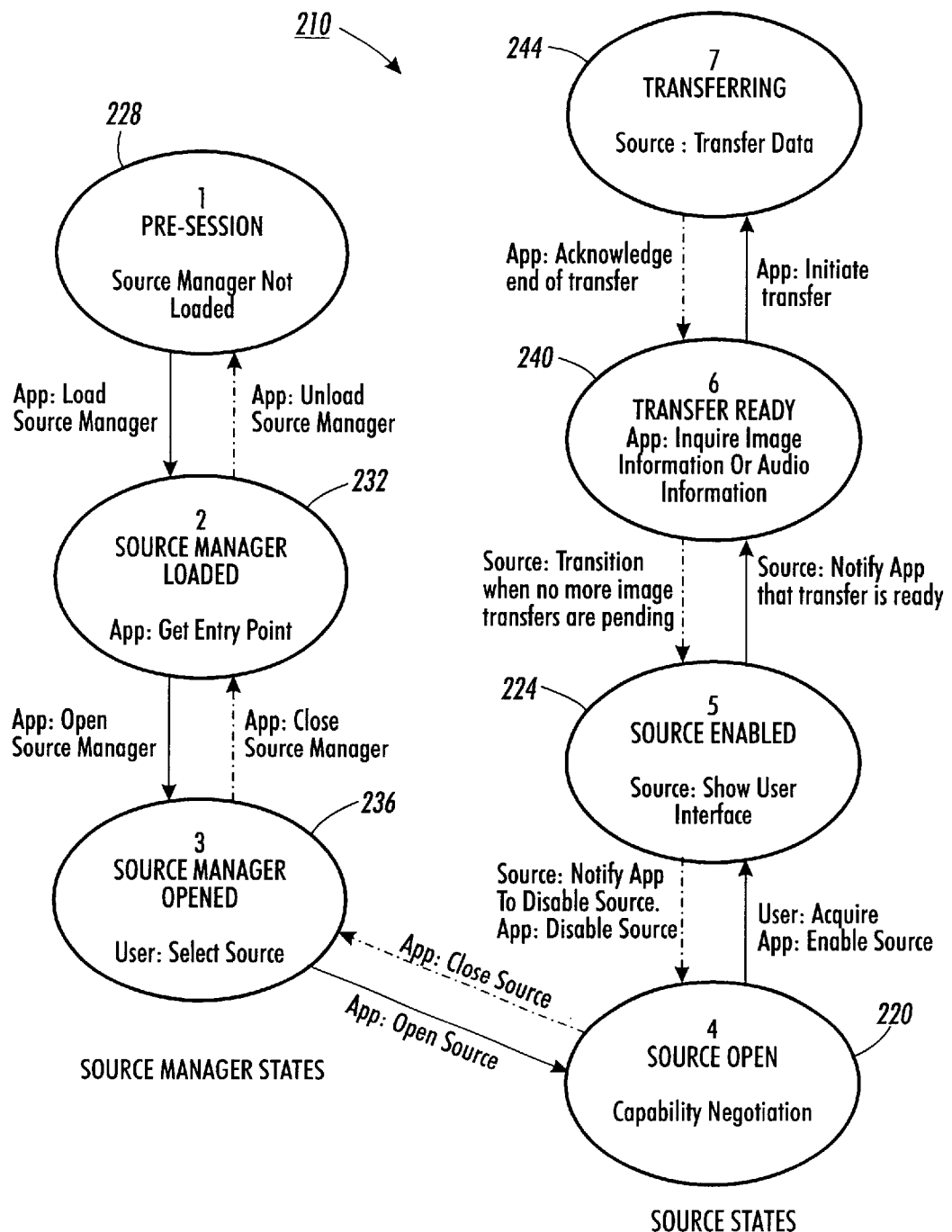
FIG. 2 is a state transition diagram of a TWAIN session.

In a destination image opening step 414 the application is started and an image is loaded. Of course, the image may be a blank image or the image may be non-blank. In a target area selection step 418 the user selects a portion of the destination image as a target for the placement of a new image. When the target area selection is final, the application records dimensions of the selected area. For example, the height and width of a selection or rubber band box are recorded. When the user indicates that an image source is to be a particular TWAIN source the application looks for a TWAIN Source Manager. If no TWAIN Source Manager is available the application issues commands to load a Source Manager, thereby changing the TWAIN state of the Source Manger from state 1 to state 2 (see FIG. 2 228, 232). The application then issues a TWAIN triplet to open the Source Manager. For example, the application sends the Source Manager a DG_CONTROL/DAT_PARENT/MSG_OPENDSM triplet. This command causes the Source Manger to initialize itself and moves the Source Manager into TWAIN state 3 (see FIG. 2 236). The Source Manger is now ready to receive further commands from the application. With a Source Manager available, the application prepares to send a triplet to open the indicated TWAIN image source. For example, the application prepares a TWAIN data structure that contains, among other things, a resolution setting. Preferably, the resolution setting is selected in a resolution selection step 422, to be a low or default resolution setting that instructs the Source to scan the source image at a low resolution. Other resolution settings may be used. However, scanning at low resolution is faster than scanning at high resolution and often a low-resolution representation of the source image is all that is needed in order to make an image source portion selection. Optionally, the user may be allowed to select a higher resolution setting. For example, the user may require increased image representation detail, in order to make an accurate source image portion selection. Additionally, in a default selection box preparation step 426, the application fills a portion of a TWAIN data structure with a default selection box description. For example, the application describes the size, shape and location of the rubber band box that was placed in the destination image (in steps 318 or 418). This description will be used when a Source user interface is shown and used in steps described below. Steps 418, 422, and 426 are related to the users performance of the image-opening step 318. Similarly, source-opening step 322 is related to a Source opening step 430 and a Source enabling step 434.

In Source opening step 430, the application sends the Source Manager a command to open an appropriate Source. For example, the application sends the Source Manager a DG_CONTROL/DAT_IDENTITY/MSG_OPENDS triplet. This command opens source software ("Source") that acts as an interface between the Source Manager and the source device. For example, the Source communicates with the indicated scanner. The source opening step 430 places the Source in TWAIN state 4 (see FIG. 2 220).

In the source-enabling step 434 the application sends a command to the Source Manager to enable the Source. For example, the application sends the Source Manager a DG_CONTROL/DAT_USERINTERFACE/MSG_ENABLEDS triplet. The Source Manager passes this triplet on to the Source. A function call that includes the triplet also includes a pointer to an appropriate TWAIN data structure. The data structure contains the description of the resolution setting and the default or initial rubber band box description. Additionally, the structure contains a parameter that is set (ShowUI=TRUE) to call for the displaying of a Source user interface ("UI") The source-enabling step 434 places the Source in TWAIN state 5 (see FIG. 2 224) and causes the Source to pre-scan the source image and display a representation of the source image in the UI. Additionally, a default selection box is placed on the displayed representation of the source image. For example, a rubber band box that is the same size and shape as the rubber band box in the destination image is placed in the representation of the source image. The rubber band box is place on the representation of the source image at a location that corresponds to the location of the target area in the destination image. This is useful in instances where the destination image and the source image are similar, and the source is being used to update or repair the destination image. For example, the default rubber band box is useful where an electronic copy of an old letterhead is being updated with names from a paper copy of a new letterhead.

Where the source and destination images are not the same, a selection box adjustment step 438 allows new selection box parameters to be set. For example, as described in relation to the portion selection step 326, the user uses the Source UI to move the rubber band box to encompass a desired portion of the representation of the source image. This indicates the portion of the image that the user wishes to copy and paste into the destination image.

When the user is satisfied with the indicated selection, the user indicates that the selection is a final selection. For example, the user selects a scan command in the UI. Typically, the indication that the selection is final causes the Source to rescan the indicated portion of the source image and to notify the application that a data transfer is ready. As this is done, the Source transitions to TWAIN state 6 (see FIG. 2 240).

The application responds to the notification by issuing a command that causes image information to be transferred from the source, through the Source Manager to the application. For example the application sends the Source (through the Source Manger) a DG_IMAGE/DAT_IMAGEINFO/MSG_GET triplet. This triplet causes the Source to transition to TWAIN state 7 (see FIG. 2 244) and to transfer image information to the application. For example, the Source transfers information regarding the size, shape and resolution of the selected portion of the image to the application. Additionally, the source may transfer pixel information regarding the selected portion of the source image.

In a Source closing step 444, the Source transitions back to TWAIN state 5 and notifies the application that it is appropriate to disable the Source. The application then issues commands to disable the source, thereby returning the Source to TWAIN state 4. For example the application sends the source a DG_CONTROL/DAT_USERINTERFACE/MSG_DISABLEDS triplet (through the Source Manger).

In a resizing parameter calculation step 448 the application compares the size and shape of the selected portion of the source image to the size and shape of the target image and determines resizing parameters. For example, the application calculates a scaling factor. Additionally or alternatively, the application determines an appropriate scanning resolution. Depending on user or application preferences, the application may calculate a scaling factor for one dimension or multiple dimensions. For example, a scaling factor may be calculated for one or both of a height and a width dimension.

In a Source restarting step 452 the application again issues commands to enable the source. However, this time the user does not need to interface with the source. Therefore the UI is need not be displayed. For example, the application sends the source a DG_IMAGE/IMAGELAYOUT/MSG_SET triplet to the source. The triplet is accompanied by a pointer to a TWAIN data structure that contains scaling and or resolution information as well as parameters describing location, size and shape of the selected portion of the source image. Additionally, the structure contains a parameter that may be set (ShowUI=FALSE) to prevent the displaying of the Source UI. The Source transitions to TWAIN state 5, and passes the scaling, resolution selected portion, and other parameters to the source device. The source device scans and scales the image as directed by the passed parameters and passes information from the scan to the Source. The Source transitions to TWAIN state 6 and informs the application that the Source is ready to transfer image information.

Using the source device to do image scaling in this way, is better than, for example, scaling the image portion in the application. For example scanners often do most if not all of the image processing done on an image. It is best to do scaling before most image processing procedures. Therefore, in order to do scaling before image processing, the scanner must do the scaling. For example, if the source image is a continuous tone image and the desired image is a binary halftone version of the image, then it is best to do scaling before creating the binary halftone version of the image. If the scaling is done before halftoning, then the quality of the halftoning will be better. This is because the scaling can be done in the gray domain and halftoning cell size is therefore unaffected by scaling. Since the scanner does the conversion to binary halftone, the only way for scaling to be done first is for the scanner to also do the scaling.

Upon receipt of the notification that the Source is in state 6 the application issues a command to start image data transfer. For example, the application sends the source a DG_IMAGE/DAT_IMAGEINFO/MSG_GET triplet and image information, including pixel information is transferred to the application. The application and source cooperate as described above, to return the Source to TWAIN state 4. Optionally, the application closes the source completely.

In a source image-pasting step 454 the application places the received sized version of the selected source image portion into the indicated target location in the destination image.

When the user is finished creating or adjusting the destination image, the destination image is delivered to an output device. For example, the destination image is delivered to an electronic storage device such as a disk drive or delivered to a computer network for storage. Alternatively, the destination image is delivered to a rendering device, such as a print engine. For example, in a xerographic environment, the destination image is delivered to xerographic printer comprising an imaging member, a fuser and a developer.

Figure 5:
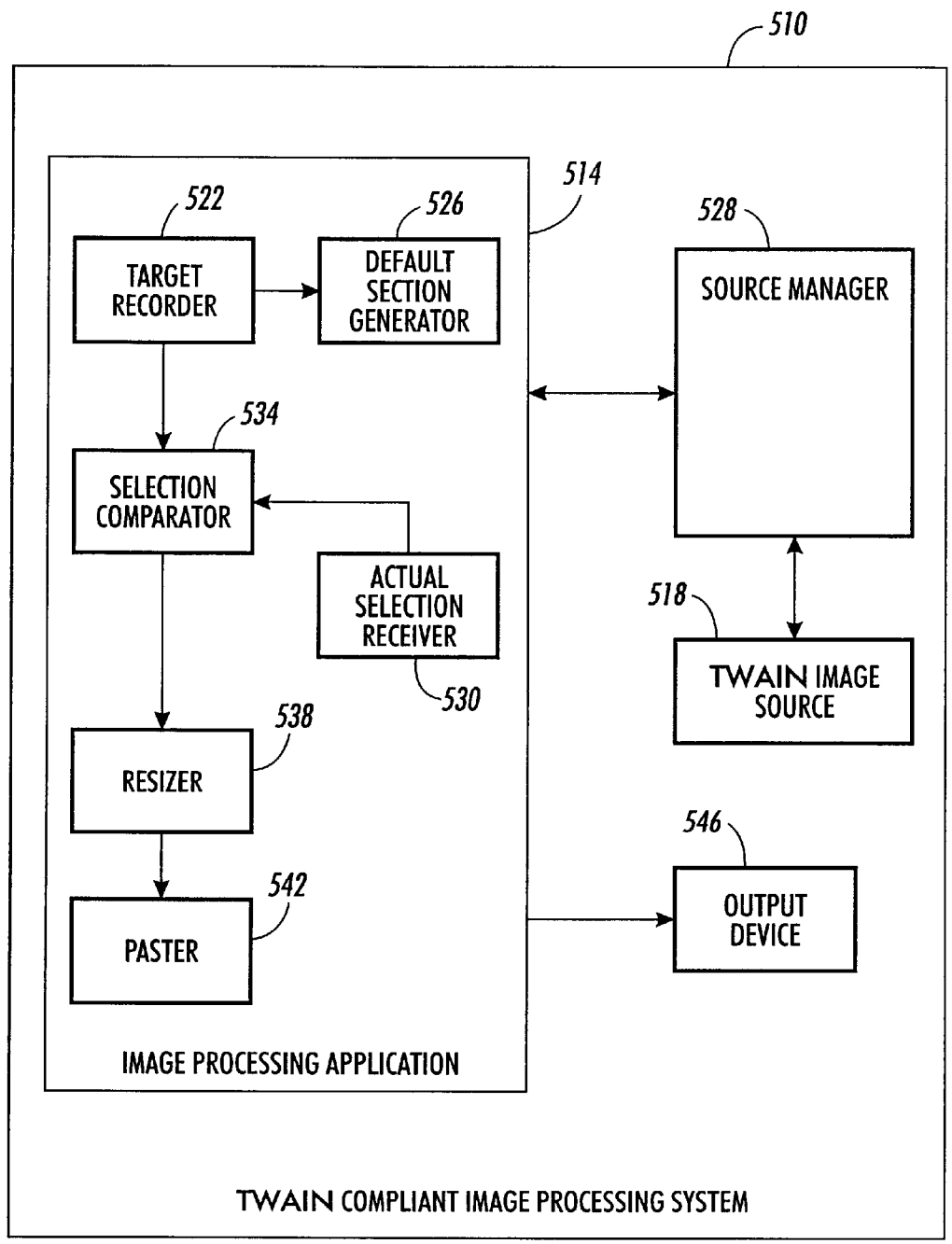
FIG. 5 is a block diagram of a TWAIN based image processing system operative to perform the method of FIG. 3 and FIG. 4.

Referring to FIG. 5, a TWAIN compliant Image Processing system operative to carry out the method 310, 410 for copying and pasting and scanning to fit comprises an application 514 and a TWAIN image source 518. The application comprises a target recorder 522, a default generator 526, a source manager 528, an actual selection receiver 530, a selection comparator 534, a resizer 538 and a paster 542. Additionally, the system 510 includes an output device 546.

The target recorder 522 records a users selection of a target area in a destination document (step 318 or 418). For example, selection information is stored in a memory (not shown). Additionally, the selection information, or a pointer to the selection information, is passed to the default selection generator 526.

The default generator 526 generates information describing a default selection area in a source image (not shown) (step 426). Additionally, the default generator 526 determines other default or initial parameters. For example, the default generator 526 negotiates capabilities with the TWAIN image source 518 and generates information describing or calling for a default or preview mode resolution setting (step 422). The information generated by the default generator 526 is made available to the Source Manager 528, by the application 514. For example, the application sends commands to open and enable a TWAIN image Source 518 (steps 430 and 434). Access to the generated default information is included in those commands.

The actual selection receiver 534 receives and stores information about an actual source image portion selection the user makes regarding a portion of a source image (not shown) the user wishes to copy (step 326 or steps 438, 442). The actual selection receiver 534 receives the actual selection information from the application 514. The application 514 receives the actual selection information from the Source Manager 528, which relays the information from the TWAIN image source 518. The actual selection information is stored in, for example a memory(not shown). Additionally, the actual selection receiver 534 makes the actual selection information available to the selection comparator 534.

Similarly, the selection comparator 534 receives access to target selection information from the target recorder 522. The selection comparator 534 compares the selected target area with the actual source image portion selection. For example, the selection comparator 534 compares the dimensions of the target area and the source image portion selection. The selection comparator 534 reports information regarding the comparison to the resizer 538. For example, the selection comparator 534 reports dimension comparison ratios to the resizer 538. For instance, a height of the actual source portion selection may be 1.25 times larger than a height of the target area selection. Additionally a width of the actual source portion selection may be, for example, the same as a width of the target area selection.

The resizer 538 accepts the information provided by selection comparator 534 and determines a set of scanning parameters to accommodate an indicated pasting desire of the user (step 448). For example, the resizer consults capabilities of the source previously negotiated or accessed. Alternatively, the application requests capability information about the source for the resizer 538. The resizer 538 then determines or selects a combination of scanning parameters to accommodate the pasting desire of the user, as indicated by the target selection and source image portion selection of the user. For example the resizer 538 calculates one or more scaling factors, and/or selects a scanning resolution. Optionally, the resizer 538 selects one or more image processing techniques, such as for example, smoothing or edge enhancement. The application 514 includes the determined resizing parameters in a command, to the TWAIN image source 518. The command directs the TWAIN image source 518 to scan the selected portion of the source image (step 452).

The paster 542 receives image information and includes the image information in the destination image (not shown) at the selected target area (not shown). For example, the Source Manger receives scan information from the image Source and passes the information to the application 514. The application makes the scan information available to the paster 542 portion of the application 514 and the paster 542 combines the information with destination image information at a point indicated by the target area selection.

Typically, when the user is finished modifying the destination image, or at appropriate intermediate points in the process, for example, as indicated by the user, the destination image is delivered to an output device 546. The output device 546 is, for example, a computer storage device, such as a memory or disk drive. Alternatively, the output device 546 is a computer network. The output device 546 may also be a rendering device, such as, for example, a print engine. For instance, in a xerographic environment, the output device is a xerographic print engine, comprising, for example, an imaging member, a fuser, and a developer.

Preferably, the detailed components 522, 526, 530, 534, 538, 542 of the application 514 (and the rest of the application 514) are implemented as software modules. The software modules are stored in a memory device such as a disk drive or non-volatile random access memory and run by a computational devices, such as, for example, a microprocessor.

The invention has been described with reference to particular embodiments. Modifications and alterations will occur to others upon reading and understanding this specification. For example, where a rubber band box is used, another selection device may be substituted. For example a rubber band circle or an irregularly shaped selection perimeter may be used. Where the invention has been described in terms of a Source User Interface run in a modal mode, modifications may be included to accommodate a Source User Interface run in a non-modal mode, thereby allowing the user to, for example, switch back and forth between a UI window and an application window. The functions of the detailed application components 522, 526, 530, 534, 538, 542 may be modified and/or distributed among a different set of modules. Indeed, the functions may be distributed and incorporated in the application 514 as a whole, without the distinct functional divisions describe above. Where a xerographic print engine is mentioned other print engines may be substituted. For example the output device 546 may be an ink jet printer. It is intended that all such modifications and alterations are included insofar as they come within the scope of the appended claims or equivalents thereof.

What is claimed is:

1. A method operative to accomplish copy and paste, and scan to fit, using a TWAIN data source, the method comprising:

selecting a target portion of a destination image, displayed in an application;

selecting a portion of a source image, displayed in a source user interface;

passing coordinate information, corresponding to the selected portion of the source image, to the application;

determining at least one resizing parameter based on a difference between the target portion and the selected portion of the source;

scanning the selected portion of the source image in a manner that is based on the at least one resizing parameter, to generate a properly scaled copy of the selected portion of the source image; and pasting the properly scaled copy in the target portion of the destination image.

2. The method of claim 1 wherein selecting a portion of a source image comprises:

showing a source user interface;

pre-scanning an image to generate a pre-scan version of the image;

displaying the pre-scan version of the image; and placing a rubber band box around a portion of the displayed image.

3. The method of claim 1 wherein determining at least one resizing parameter comprises calculating at least one sealing factor.

4. The method of claim 1 wherein determining at least one resizing parameter comprises selecting a scanning resolution.

5. The method of claim 1 wherein scanning the selected portion comprises:

opening the source;

passing the at least one resizing parameter to the source;

commanding the source to scan the selected portion according to the at least one resizing parameter.

6. The method of claim 1 further comprising, prior to selecting a portion of a source image:

opening a source; and pre-scanning an image to generate the source image.

7. The method of claim 1 wherein passing coordinate information comprises:

scanning the selected portion;

transferring coordinate information to the application; and closing a source user interface.

8. The method of claim 1 wherein determining at least one resizing parameter comprises:

discarding the transferred image data; and comparing the transferred coordinate information to coordinate information of the target portion.

9. A method operative to copy and paste a portion of a TWAIN compliant data source image into an image displayed by a TWAIN compliant application, the method comprising:

selecting a preview mode resolution setting;

determining initial selection box settings;

opening a TWAIN compliant data source, thereby placing the data source in TWAIN state 4;

enabling the data source with TWAIN parameter SHOWUI=TRUE and passing the selected preview mode resolution setting and the selection box settings to the data source, thereby causing an image to be pre-scanned and displayed along with a selection box, according to the initial selection box settings, and placing the data source in TWAIN state 5;

adjusting the selection box settings if need be, in order to select a desired portion of the image for scanning and copying;

scanning the selected portion of the image thereby transitioning to TWAIN state 6;

transferring the scanned portion to the application, thereby passing adjusted selection box settings to the application;

returning the source back through TWAIN states 6, 5, and 4;

determining resizing parameters based on the adjusted selection box settings and dimensions of a target area in the image in the application;

enabling the data source with TWAIN parameter SHOWUI=FALSE and passing resizing parameters and the adjusted selection box settings to the data source, thereby causing the image to be scanned, creating an appropriately sized copy of the selected portion of the image;

transferring the appropriately sized copy of the selected portion of the image to the application;

placing the copy of the selected portion of the image in the target area.

10. The method of claim 9 further comprising, after determining resizing parameters and before the step of, the step of determining resizing parameters:

closing the data source.

11. The method of claim 10 further comprising, after returning the source back through TWAIN states 6, 5, and 4, and before enabling the data source with SHOWUI=FALSE, the step of:

opening the TWAIN compliant data source, thereby placing the TWAIN compliant data source in TWAIN state 4.

12. An image processing system operative to communicate with a TWAIN image source, and copy and paste and scan to fit a selected portion of a source image into a selected target area in a destination image, the image processing system comprising:

a TWAIN image source;

a source manager;

an application operative to communicate with the image source, through services of the source manager, to direct the image source to generate properly resized copy of the selected portion of the source image to fit the selected target area, to receive the properly resized copy of the selected portion of the source image, and to automatically paste the properly resized copy of the selected portion of the source image into the selected target area of the destination image to generate a revised image; and an output device operative to receive the revised image.

13. The image processing system of claim 12 wherein the output device is a xerographic printer.

14. The image processing system of claim 12 wherein the application comprises:

a target recorder operative to store dimensional information regarding the selected area of the destination image;

a source image portion selection receiver operative to receive and store dimensional information regarding the selected portion of the source image; and a selection comparator operative to compare target area dimensional information provided by the target recorder and source image portion selection information provided by the source image portion selection receiver and to summarize dimensional differences between the selected target area and the selected portion of the source image.

15. The image processing system of claim 12 wherein the application comprises:

a resizer operative to determine at least one scaling factor and request the TWAIN image source to scan the selected portion of the source image based on the at least one scaling factor.

16. The image processing system of claim 12 wherein the application comprises:

a resizer operative to determine a scanning resolution and request the TWAIN image source to scan the selected portion of the source image at the determined scanning resolution.

17. The image processing system of claim 12 wherein the application comprises:

a resizer operative to determine a scanning resolution and at least one scaling factor and generate a signal controlling the TWAIN image source to scan the selected portion of the source image based on the determined scanning resolution and the at least one scaling factor.

* * * * *